United States Patent [19]

Heese et al.

[11] Patent Number: 5,496,865

[45] Date of Patent: Mar. 5, 1996

[54] ADDITIVE-CHARGED POROUS CARRIER MATERIAL

[75] Inventors: Ulrich Heese, Mulligen; Renato Salvel, Zurich; Wolfgang W. Neumann, Oberbozberg, all of Switzerland

[73] Assignee: Brugg Kabel AG, Switzerland

[21] Appl. No.: 349,396

[22] Filed: Dec. 5, 1994

[30] Foreign Application Priority Data

Dec. 8, 1993 [CH] Switzerland .......................... 03651/93

[51] Int. Cl.$^6$ ...................................................... C08J 9/00
[52] U.S. Cl. ................... 521/79; 521/65; 521/81; 521/94; 521/97; 521/130; 521/165; 521/177; 521/183; 521/184; 521/191
[58] Field of Search .................................. 521/79, 65, 81, 521/94, 97, 130; 525/165, 177, 183, 184, 191

[56] References Cited

U.S. PATENT DOCUMENTS

| 4,588,754 | 5/1986 | Liu ............................................. 521/92 |
| 4,783,511 | 11/1988 | Schmid . | |

FOREIGN PATENT DOCUMENTS

| 0197631 | 10/1986 | European Pat. Off. . |
| 0459208 | 12/1991 | European Pat. Off. . |
| 5179009 | 7/1993 | Japan . |
| 863732 | 3/1961 | United Kingdom . |

OTHER PUBLICATIONS

Chemical Abstracts, vol. 81, No. 14, Oct. 7, 1974, K. Tashio et al. for Dispersible Colored Porous Master Batch for Abstract No. 78823n.

*Primary Examiner*—James J. Seidleck
*Assistant Examiner*—Duc Truong
*Attorney, Agent, or Firm*—Bachman & LaPointe

[57] ABSTRACT

The pourable porous carrier material is produced from at least one thermoplastic basic polymer with additives incorporated in the porous structure.

First suitable foaming agents are added to the basic polymer, the mass is melted, mixed before and/or after melting. The mixture is then preferably extruded and cooled to form a pourable porous carrier material.

At least one additive is added to the porous carrier material and mixed with this at a temperature ($T_M$) below the melting point of the basic polymer but above the melting point of the additive.

The porous carrier material has preferably ellipsoid pores which are brought into their longitudinal form during extrusion.

14 Claims, No Drawings

ADDITIVE-CHARGED POROUS CARRIER MATERIAL

BACKGROUND OF THE INVENTION

The invention refers to a process for the production of a pourable porous carrier material from at least one thermoplastic basic polymer with additives incorporated in the porous structure. The invention also refers to the use of the charged porous carrier material produced according to this process.

Polymers consist of molecule chains with numerous components which repeat themselves practically endlessly, which differ from low molecular compounds in relation to physical properties, for example in relation to their high tensile strength and elasticity.

Polymerized plastic masses have appropriate additives mixed in during industrial processes depending on the further processing and application. The basic polymers can thus be adapted to individual products and/or requirements.

Between basic polymers on one side and fluid or easily melting additives on the other, there is a great difference in viscosity which can lead to incompatibility. Usually therefore only low proportions of additives can be mixed into the basic polymers.

To avoid metering problems and to achieve a more homogeneous distribution, many plastic processors prefer a concentration of the relevant additives in the basic polymer. Thus a basic polymer or a mixture of basic polymers with one or several additives is heated, melted, mixed and transferred in a pourable form, for example in carrier materials charged with additives in granulate form. These are known as additive master batches.

For porous or microporous polymer structures, numerous production processes and various applications are known. Manufacturing examples are phase inversion, nuclear bombardment to incorporate microporous solid particles and sintering of small microporous particles.

U.S. Pat. No. 4,247,498 describes a process in which any synthetic thermoplastic polymers can be produced microporous. The polymers are heated in a compatible fluid as long and as far as necessary to form a homogeneous solution. This is brought into the required mold in which it is cooled until a thermodynamically unbalanced fluid/fluid phase separation occurs. Thus without the effect of mixing or other shear forces, a solid is produced which can be handled without physical degradation. Finally, at least one essential part of the fluid is removed from the resulting solid to form the required microporous polymer. A narrow spread of pore sizes, as measured by mercury intrusion porosimetry, is of essential importance and is expressed analytically with the sharpness function "S". By application of U.S. Pat. No. 4,247,498, polymers with spherical pores are produced which contain a functional active fluid such as polymer additives. The charged microporous polymers behave as solids and can be processed as such. To charge the microporous polymers, any organic fluid can be used which does not dissolve the polymer and which is compatible with this. The functional active fluid can be incorporated by absorption, exchange processes, infusion processes or similar known processes, also with the use of an intermediate product.

SUMMARY OF THE INVENTION

The task of the inventors is to create a process of the type described above which offers the plastics processor a solution for addition of additives to his mass plastics with the use of a carrier material charged and produced according to the process. Also, reactive additives produced in this process can be transferred in a material-saving manner in the form of a charged master batch.

In relation to the process, the task is solved according to the invention in that:
suitable foaming agents are added to the basic polymers, the mass is melted, mixed before and/or after melting and the mixture cooled to form the pourable porous carrier material, and
at least one additive is added to the porous carrier material and mixed with this at a temperature below the melting point of the basic polymer but above the melting point of the additive.

Special and further design forms of the process are described hereinbelow.

DETAILED DESCRIPTION OF PREFERRED EMBODIMENTS

Although the important technical and economic advantages of the invention only apply fully when both processing stages are used, the individual process steps may also be combined with known process steps or products.

The granular or pelletized porous carrier material preferably consists of a first polymer more dimensionally stable at higher temperatures and a second polymer which can also store the relevant additive in the solid phase of the carrier. For simplicity, such carriers are known as two-phase structures which consist of porous hollow cavities and a polymer phase.

The basic polymers used which are foamed and charged with an additive according to the invention can for example be selected from the following four groups:
a homopolymer consisting of an α-olefin with 2–8 carbon atoms or a copolymerizate of two corresponding α-olefins, preferably copolymerizates of ethylene, also a homopolymerizate of low (LDPE), linear low (LLDPE), very low (VLDPE), ultra low (ULDPE) or high density (HDPE), propylene, also a homopolymerizate, 1-butylene, 1-pentylene, 1-hexylene, 1-octylene, isobutylene, 2-methyl-1-butylene, 3-methyl-1-pentylene, 4-methyl-1-pentylene, 2,3 dimethyl-1-butylene, 2-ethyl-1-butylene, and mixtures thereof,
a copolymerizate of ethylene with 1-butylene, 1-hexylene, 1-octylene or 4-methyl-1-pentylene.
an ethylenevinylacetate copolymerizate, an ethyleneethylacetate copolymerizate, an ethyleneacrylic acid copolymerisate and mixtures thereof or with copolymers of ethylene and 1-butylene, 1-hexylene, 1-octylene or 4-methyl-1-pentylene.
ethylenepropylene rubber (EPDM), also diene modified (EP), a styrene butadiene styrene copolymerizate (SBS), a styrene ethylene butylene styrene copolymerizate (SEBS) and mixtures thereof.

The basic polymers are usually available in granular or pellet form. They are easily pourable and therefore suitable for mixing with foaming agents.

In industrial practice, of the broad range of basic polymers available for porous carrier materials, in particular polyethylene with high density (HDPE), low (LDPE) or linear low (LLDPE) density, ethylvinylacetate copolymerizate (EVA) and mixtures thereof are used.

Suitable foaming agents for basic polymers are for example azodicarbonamide and citric acid derivatives, e.g. hydrocerol, which are preferably added and mixed with the basic polymer at 0.1 to 2 w. %.

The basic polymer is preferably mixed with the suitable foaming agents using an extruder or multishaft kneader extruders. This gives a porous to fine porous three-dimensional structure with an even distribution of cavities depending on the degree of mixing. The pore structure is however no longer spherical as for example with a product according to U.S. Pat. No. 4,247,498, but always deformed into an ellipsoid form of the individual pores. The ratio of the longest to the shortest internal diameter is at least approximately 2 and in particular 3 to 5.

The porous extrudate is transferred to the granular or pelletized carrier material with appropriate known devices, for example by extrusion granulators. The pore volume preferably lies in the range of 50 to 70 w. % in relation to the total volume.

The porosity of the carrier material can be increased further if at least for part of the time an inert gas, for example nitrogen, is introduced into the melt of the basic polymer and foaming agents. The quantity of the suitably finely sprayed gas depends for example on the basic polymer, the proportion of foaming agents, the temperature and the total quantity of the melt.

The granular or pelletized porous carrier materials are charged with at least one fluid and/or easily meltable additive and mixed as intensively and evenly as possible on known mixing devices. During mixing, the pores of the carrier body fill with the fluid or fluidized additive. With easily meltable additives, the temperature must be increased until fluidization, with viscous additives this is advantageous to make them less viscous. The absorption capacity of the carrier material is generally improved by a higher temperature, for which reason the mixing temperature $T_M$ for the additives preferably lies in the range of 30° to 140° C., in particular between 40° and 90° C.

The porous carrier material charged with additives, which is preferably formed partly open-pore, is also known as the additive master batch as stated. It is preferably charged with a charging degree of 5 to 80 w. %, in particular 15 to 60 w. % in relation to the charged carrier, which requires a correspondingly high pore volume.

Porous carrier materials with a high charging degree with regard to additives are advantageous as they only need be added to the processing mass plastic in low quantities to achieve a certain additive content.

The additives mixed in are for example anti-static agents, anti-smearing agents, adhesives, calendering aids, mold separating agents, slip additives, lubricants, softeners, fragrances and/or flame protection agents.

For function-related additives the following examples are given:
slip additives: acid amides
slip additives and mold separating agents: neutral wax, fatty acid esters of glycerine, stearic acid, neutral ester wax, fatty alcohols, acid esters of fatty alcohols, polyolesters
adhesives, anti-smearing agents (antifogs): neutral polyolesters of fatty acids
anti-static agents, antifogs: nitrogen-containing fatty derivatives; nitrogen-free non-ionogenic compounds, e.g. polyethylene glycolester or polyethylene glycolether, fatty acid esters, mono or diglyceride, ethoxylated fatty amines; anion-active compounds, e.g. alkylsulfonate, alkylsulfate or alkylphosphate; cation-active compounds, e.g. quaternary ammonium compounds.

Other chemical compound types are suitable as additives without specifying a particular usage: fatty acids, fatty alcohol dicarbonic acid esters, fatty acid monoamides, fatty acid diamides (amide wax), metal soaps, oligomer fatty acid esters (fatty acid complex esters), fatty alcohol fatty acid esters, waxy acids, waxy acid esters, polar polyethylene wax, covalent polyethylene wax and paraffins.

To carry out the process, preferably known extruders and/or multi-spiral kneader extruders are used as mixing and melting apparatus, which are dimensioned for the necessary throughput and for the first process stage, the production of porous carrier material, and comprise means for the production of granulates or pellets. The preferred extrusion leads to a carrier structure with an ellipsoid pore structure, which is ideal in the context of the present invention.

The use according to the invention of the charged porous carrier material produced according to the process lies in the addition of additives to plastic masses, in particular the production of sheets and for injection molding or casting.

For sheets, preferably anti-static agents, anti-fogs, adhesives and/or calendering aids are used as additives, and for injection molding or casting, also mold separating agents and/or slip additives.

To summarize, the process according to the invention for the production and charging of porous carrier materials, known as additive master batches, offers the plastics processor an extraordinarily simple and low cost solution for adding additives to the mass plastics, in particular for the fields of sheet production and injection molding. The process also allows the transfer of reactive additives in a material-saving manner at low temperature and low shear stress in the form of additive master batches.

We claim:

1. Process which comprises: producing a pourable porous carrier material from at least one thermoplastic basic polymer having a melting point with additives incorporated in the porous structure; wherein at least one foaming agent is added to the basic polymer, the foaming agent and basic polymer are melted and mixed together with the mixing step taking place at least one of before and after melting, and the mixture cooled to form a granular or pelletized porous carrier material; adding into the porous carrier material at least one additive having a melting point, and mixing said additive with said porous carrier material at a temperature ($T_M$) lying below the melting point of the basic polymer but above the melting point of the additive; and wherein pores of the carrier material contain said additive.

2. Process according to claim 1, wherein the basic polymer is a mixture of a first polymer more dimensionally stable at higher temperatures ($T_M$) and a second polymer which can also store the additive in the solid phase of the carrier.

3. Process according to claim 1, wherein the basic polymer is selected from one of the following four groups (1) a homopolymer of an α-olefin with 2–8 carbon atoms, a copolymerizate of two corresponding α-olefins, a homopolymerizate of low density propylene (LDPE), linear low density propylene (LLDPE), very low density propylene (VLDPE), ultra low density propylene (ULDPE), and high density propylene (HDPE), and a homopolymerizate selected from the following group: 1-butylene, 1-pentylene, 1-hexylene, 1-octylene, isobutylene, 2-methyl-1-butylene, 3-methyl-1-pentylene, 4-methyl-1-pentylene, 2,3-dimethyl-1-butylene, 2-ethyl-1-butylene and mixtures thereof;

(2) a copolymerizate of ethylene with a material selected from the group consisting of 1-butylene, 1-hexylene, 1-octylene, 4-methyl-1-pentylene;

(3) (A) ethylenevinylacetate copolymerizate, ethyleneethylacetate copolymerizate, ethyleneacrylic acid copolymerizate and mixtures thereof, (B) copolymers of ethylene and a material selected from the group consisting of 1-butylene, 1-hexylene, 1-octylene, 4-methyl-1-pentylene;

(4) ethylenepropylene rubber (EPDM), diene modified ethylenepropylene rubber (EPR), styrene butadiene styrene copolymerizate (SBS), styrene ethylene butylene styrene copolymerizate (SEBS), and mixtures thereof.

4. Process according to claim 3, wherein the copolymerizate of two corresponding α-olefins is a copolymerizate of ethylene.

5. Process according to claim 1, wherein the foaming agent used is azodicarbonamide and citric acid derivatives, added to the basic polymer at 0.1–2 wt. % in relation to the basic polymer.

6. Process according to claim 1, wherein the mixture of the basic polymers and foaming agents is extruded to produce ellipsoid pores to a ratio of longest to shortest diameter of at least two.

7. Process according to claim 6, wherein said ratio is from 3–5.

8. Process according to claim 1, wherein during mixing of the foaming agent and basic polymer, an inert gas is added for at least part of the time.

9. Process according to claim 8, wherein the inert gas is nitrogen.

10. Process according to claim 1, wherein the additive is added to a charging degree of 5–80 wt. % at a temperature ($T_M$) of 30°–140° C.

11. Process according to claim 10, wherein the additive is added to a charging degree of 15–60 wt. % at a temperature ($T_M$) of 40°–90° C.

12. Process according to claim 1, wherein additives are added selected from the group consisting of anti-static agents, anti-fog agents, adhesives, calendering aids, mold separating agents, slip additives, lubricants, softeners, fragrances, flame protection agents and mixtures thereof.

13. Process according to claim 1, wherein additives are added selected from the group consisting of at least one of the following: fatty alcohols, fatty acids, fatty acid esters, nitrogen-containing fatty derivatives, fatty acid amides, waxy acids, waxy acid esters, paraffins, neutral waxes, metal soaps, acid esters of fatty alcohols, polyolesters, fatty alcohol fatty acid esters, fatty acid esters of glycerine, neutral polyolesters of fatty acids, fatty alcohol dicarbonic acid esters, fatty alcohol fatty acid esters, stearic acids, oligomer fatty acid esters, fatty acid monoamides, fatty acid diamides, neutral ester waxes, polar polyethylene wax, covalent polyethylene wax, nitrogen-free non-ionogenic compounds, polyethylene glycolester, polyethylene glycolether, monoglyceride, diglyceride, ethoxylated fatty amines, anion-active compounds, alkylsulfonate, alkylsulfates, alkylphosphates, cation-active compounds, and quaternary ammonium compounds.

14. Process according to claim 1, including the step of adding additives to plastic material using said porous material.

* * * * *